United States Patent
Schroeder et al.

(10) Patent No.: US 9,722,452 B2
(45) Date of Patent: Aug. 1, 2017

(54) INTEGRATING A WIRELESS CHARGING DEVICE WITH A HUMAN MACHINE INTERFACE (HMI)

(71) Applicants: Jeffrey Mark Schroeder, Rochester Hills, MI (US); Dinu Petre Madau, Canton, MI (US); Gary Edward Zack, Novi, MI (US)

(72) Inventors: Jeffrey Mark Schroeder, Rochester Hills, MI (US); Dinu Petre Madau, Canton, MI (US); Gary Edward Zack, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 267 days.

(21) Appl. No.: 14/603,035

(22) Filed: Jan. 22, 2015

(65) Prior Publication Data
US 2016/0218545 A1 Jul. 28, 2016

(51) Int. Cl.
| | |
|---|---|
| *H02J 7/00* | (2006.01) |
| *H02J 7/02* | (2016.01) |
| *H02J 50/10* | (2016.01) |
| *H02J 50/90* | (2016.01) |
| *H02J 50/80* | (2016.01) |

(52) U.S. Cl.
CPC ............ *H02J 7/025* (2013.01); *H02J 7/0047* (2013.01); *H02J 50/10* (2016.02); *H02J 50/80* (2016.02); *H02J 50/90* (2016.02); *Y02E 60/7853* (2013.01); *Y04S 40/126* (2013.01)

(58) Field of Classification Search
CPC ....................................................... H02J 7/025
USPC ........................................................... 320/108
See application file for complete search history.

(56) References Cited

U.S. PATENT DOCUMENTS

| | | | |
|---|---|---|---|
| 2010/0201314 A1* | 8/2010 | Toncich | ................ H02J 7/007 320/108 |
| 2014/0203770 A1 | 7/2014 | Salter et al. | |
| 2014/0361738 A1* | 12/2014 | Lee | ........................ H02J 7/025 320/108 |

FOREIGN PATENT DOCUMENTS

WO 2014/110323 A1 7/2014

OTHER PUBLICATIONS

"WPC wireless charger with Position Alignment" https://www.youtube.com/watch?v=wW2sHP9nYJQ, (licensed under SNPower.com.Co.,Ltd in South Korea), May 19, 2013, YouTube, published online.

* cited by examiner

*Primary Examiner* — Edward Tso
*Assistant Examiner* — Ahmed Omar
(74) *Attorney, Agent, or Firm* — Dickinson Wright PLLC (57) ABSTRACT

A system and method for integrating a wireless charging device with a display is provided herein. The system includes an information receiver to receive information from the wireless charging device; an information processor to process the information, and the processed information being about a wireless charging device or an electronic device on the wireless charging device; and an information communicator to communicate the processed information to a display coupled to the system.

15 Claims, 7 Drawing Sheets

INTEGRATING A WIRELESS CHARGING DEVICE WITH A HUMAN MACHINE INTERFACE (HMI)

CROSS-REFERENCE TO RELATED APPLICATION

This application is related to U.S. patent application Ser. No. 14/603,089, filed on Jan. 22, 2015, which is assigned to the same assignee as the current application, and all of which are incorporated by reference in its entirety as if fully set forth herein.

BACKGROUND

Mobile electronics and devices are becoming increasingly popular. Often times, the mobile device (or electronic device) includes an energy storage device, and employs the power in the energy storage device to operate the functionality associated with the mobile device. The mobile device may be a smart phone, a tablet, a laptop, or the like.

In order to charge the mobile device, a wired power charging system has been conventionally provided. An operator of the mobile device may connect the mobile device to a charging source (for example, a wall outlet or a vehicle electricity adapter), and wait for the device to become charged fully, or charged at a rate greater than an initial amount. The connection may be accomplished via a wire, or a socket associated with the mobile device that allows a user to plug in the mobile device into a charging source.

In recent years, the concept of wired charging has been replaced or augmented by wireless charging. The early implementations of wireless charging employed a coil that transmitted wireless energy to a mobile device. The mobile device would be equipped with a technique to receive the wireless energy, and translate the wireless energy to usable and storable power.

In this implementation, a singular coil is provided. Thus, an implementer of this sort of wireless charging may provide various indicia that serves to guide a user of a location or context of where to place the mobile device. In this way, the user is effectively guided in placing the mobile device in an area that optimizes and ensures wireless charging efficiency.

Recently, a plethora of mobile devices have been released. In other cases, a mobile device operator may affix a case or add-on that allows wireless charging to be available. The various mobile devices each have different sizes and charging capabilities.

Further, multiple standards associated with wireless charging have been released. Thus, an electronic device may include one or more standards of wireless charging. The same may be true of the wireless charging devices. These additions to the regime of wireless charging may add an extra layer of complexity. For example, a wireless charging device may be capable of charging wirelessly with a first and second standard. An electronic charging device may be capable of receiving wireless charge with the first and the second standard. Thus, a choice may be available along with the wireless charging operation, the choice being which standard to employ during the wireless charging operation.

In certain cases, the electronic device owner may move or displace the electronic device on the wireless charging surface to improve or enable wireless charging. Further, wireless charging devices may be provided with a surface capable of accepting multiple devices of different sizes and shapes. In these cases, placement of the electronic device on the wireless charging surface may be a non-exact science.

Conventional wireless charging devices may include a light emitting diode (LED) or other simple indicator. An indicator may indicate whether the electronic device is in a position suitable for wireless charging.

SUMMARY

The following description relates to a system for integrating a wireless charging device. Exemplary embodiments may also be directed to any of the system, the wireless charging device, a display, or combinations thereof.

Additional features of the invention will be set forth in the description which follows, and in part will be apparent from the description, or may be learned by practice of the invention.

A system and method for integrating a wireless charging device with a display is provided herein. The system includes an information receiver to receive information from the wireless charging device; an information processor to process the information, and the processed information being about a wireless charging device or an electronic device on the wireless charging device; and an information communicator to communicate the processed information to a display coupled to the system.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Wireless charging devices are provided in various contexts to allow an owner of an electronic device to wirelessly charge the electronic device. This process allows the avoidance of power cords, which may be unsightly and inconvenient.

As explained in the Background section, wireless charging devices are provided along with a wireless charging surface. The wireless charging surface may be configured to receive the electronic device by operator placement. Once the operator has placed the electronic device onto the wireless charging surface, wireless charging may commence.

However, the operator may need to move the electronic device. For example, the electronic device may be moved to facilitate better wireless charging, thus ensuring proper alignment between the electronic device and the wireless charging device. Certain implementations of wireless charging devices include a LED indicator. However, a singular point of light or an LED indicator may not be enough information for an electronic device operator to properly align the mobile device for optimal wireless charging of the electronic device.

Further, the simplicity of a singular LED indicator to provide information associated with charging may frustrate the operator. This frustration may lead to a less safe driving experience (when the wireless charging device is implemented in a vehicle).

Further, wireless charging devices are becoming more complex, with more information being associated with the process of wireless charging. For example, a situation where an operator is provided with a first and second standard to facilitate wireless charging may be present. A singular LED may not provide enough information to allow an operator to make a decision.

Disclosed herein are systems, methods, and devices for integrating a wireless charging device with a human machine interface (HMI). The aspects disclosed herein allow for the coupling of an existing wireless charging device with a HMI or other device capable of outputting information. The HMI may be a display-in an instrument panel (IP) in a vehicle, or any sort of electronic device capable of providing digital information to an operator in a form more complex than a single simple LED indicator. Thus, employing the aspects disclosed herein, an electronic device's operator may experience a more robust, safer, and greater user experience while wirelessly charging an electronic device.

Figure 1:
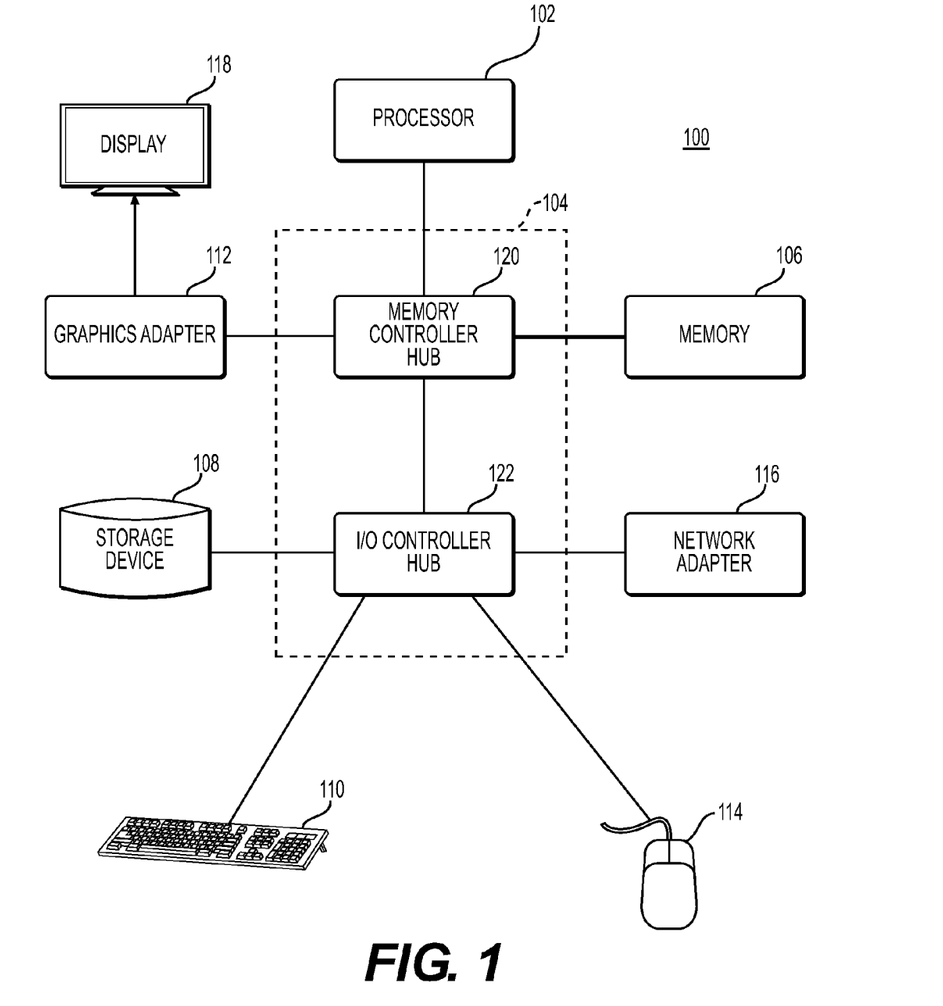
FIG. 1 is a block diagram illustrating an example computer.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network.

Figure 2:
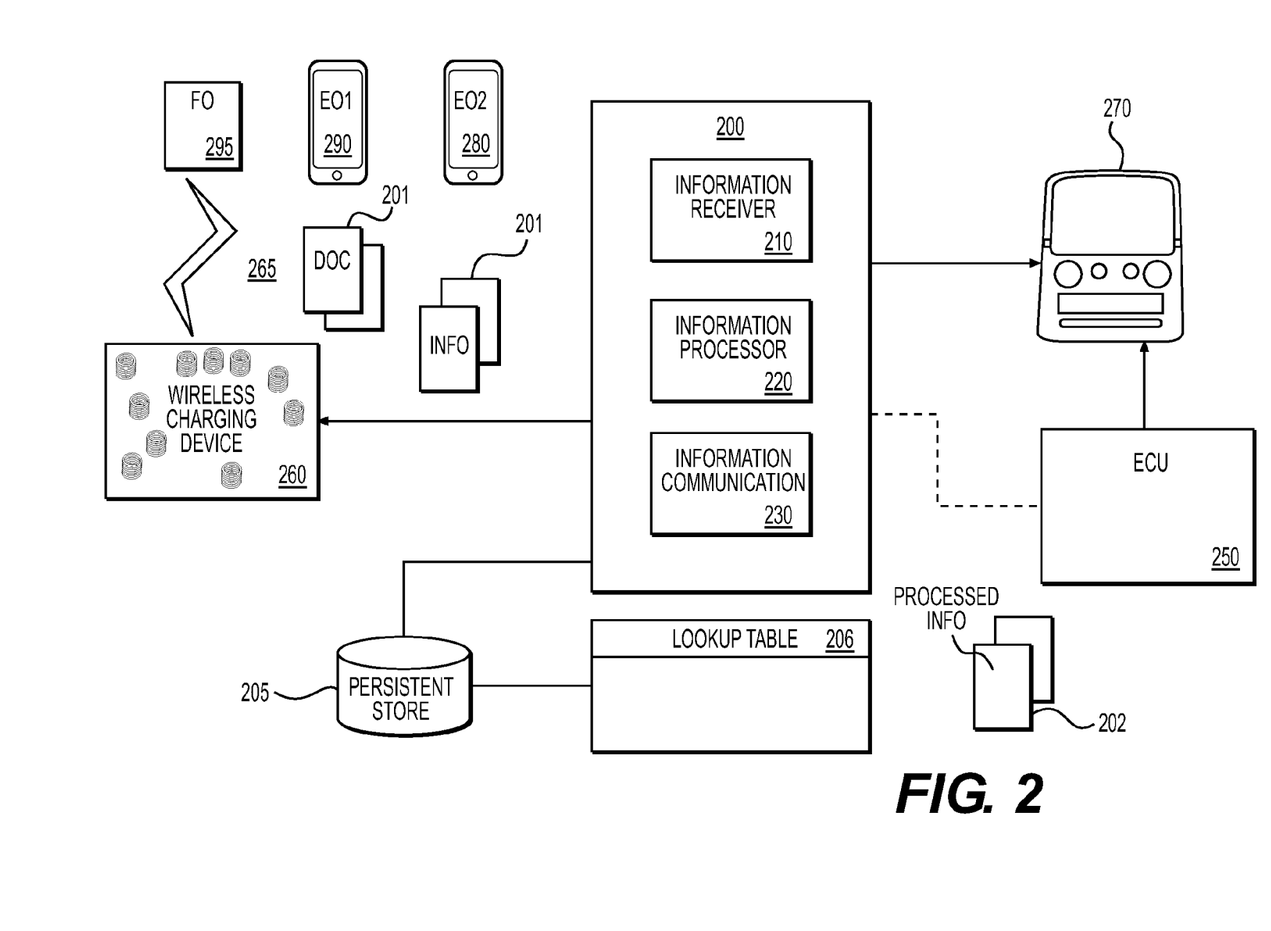
FIG. 2 illustrates an example of a system for integrating a wireless charging device with a display.

FIG. 2 illustrates an example of a system 200 for integrating a wireless charging device 260 with a display 270. The system 200 includes an information receiver 210, an information processor 220, and an information communicator 230.

The system 200 is shown as coupled to a wireless charging device 260 and a display 270. In other implementations, the system 200 may be coupled to the display 270 via an electronic control unit (ECU) 250. The ECU 250 is a generic term for any embedded system that controls one or more of the electrical systems or subsystems of a motor vehicle. In another implementation, the system 200 may be hardcoded into the ECU 250 or display 270, or provided as embedded logic as part of ECU 250 and display 270 (system-on-a-chip).

The wireless charging device 260 shown in FIG. 2 is configured to provide wireless charge 265 to a variety of devices. A device may be placed on the wireless charging device 260, and receive energy/power in a non-contact fashion. As shown in FIG. 2, an electronic device 1 280 and electronic device 2 290 are shown. This illustrates that a wireless charging device 260 may provide wireless energy 265 to more than one device at a time.

The information receiver 210 receives information 201 from the wireless charging device 260. The information 201 may be transmitted electrically via a wired or wireless technique that couples system 200 with the wireless charging device 260. The information 201 may be received via the wireless charging device 260 over a data over coil signal.

RFID is one possible communications channel but the more likely communication path between the Rx and Tx is DOC and the Tx would most likely communicate to the vehicle over a wired network (CAN, LIN etc. . . . ).

Other possible communication protocols between Rx and Tx include BT (which is specified as a primary communication channel in A4WP magnetic resonance protocol but not in the PMA or Qi inductive charging protocols) and NFC (multiple automotive OEMs are investigating adding the NFC feature in the wireless charging module).

Figure 3:
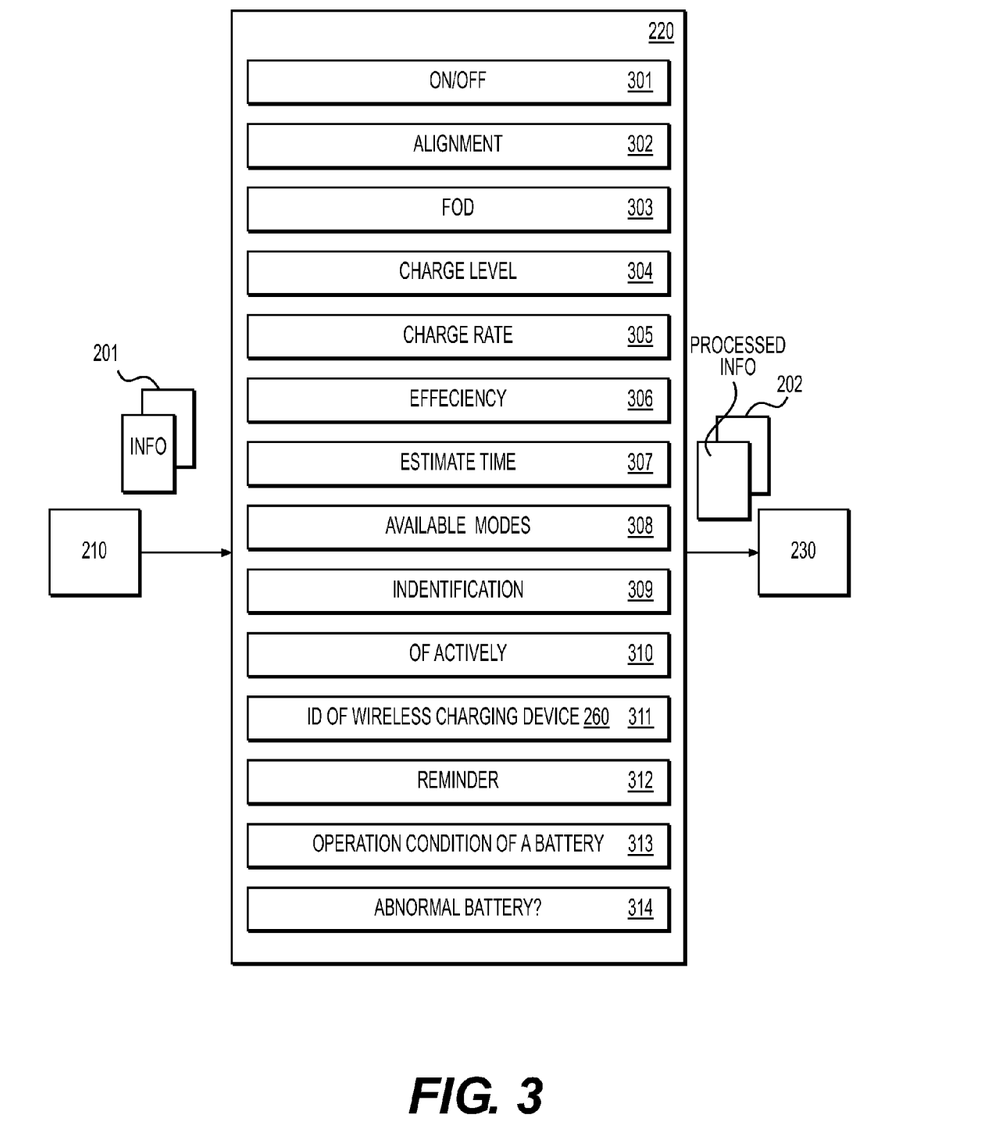
FIG. 3 illustrates an example of an implementation of the information processor of the system described in FIG. 2.

The information processor 220 may transform the information 201 into usable ways. FIG. 3 illustrates an example of an implementation of the information processor 220.

The information processor 220 includes:
1) On/off status of the wireless charging device 260 (301);
2) An alignment aid, displaying the optimal X, Y (or X, Y, Z) position of a surface or area to provide efficient wireless charging (302);
3) The presence of a foreign object 295 (or objects) (303)—a foreign object 295 may be an object that triggers a false positive detection in a wireless charging device 260;
4) one of the electronic device 1 280 or the electronic device 2 290 charge level (304);
5) the rate of at least one of the electronic devices charge rate (305);
6) the rate of at least one of the electronic devices charge efficiency (306);
7) the estimated time to charge at least one of the electronic device (307);
8) the available modes of charging associated with each electronic device or the wireless charger 260 (308);
9) the identification of each of the electronic devices (309)—in certain cases, the radio frequency employed for wireless charging may contain information identifying the device;
10) the number of actively charging electronic devices via the wireless charging device (310);
11) an identification associated with the wireless charging device 260 (311);
12) a reminder if the electronic device is placed on the wireless charging device 260, to take the electronic device when leaving a location where the wireless charging device 260 is installed (i.e. a vehicle) (312);
13) the operation condition of the battery (313); and
14) an abnormal condition associated with the battery (314).

The information received may be stored in a persistent store 205 associated with the system 200. The persistent store 205 may be any of the storage devices enumerated above.

Figure 4:
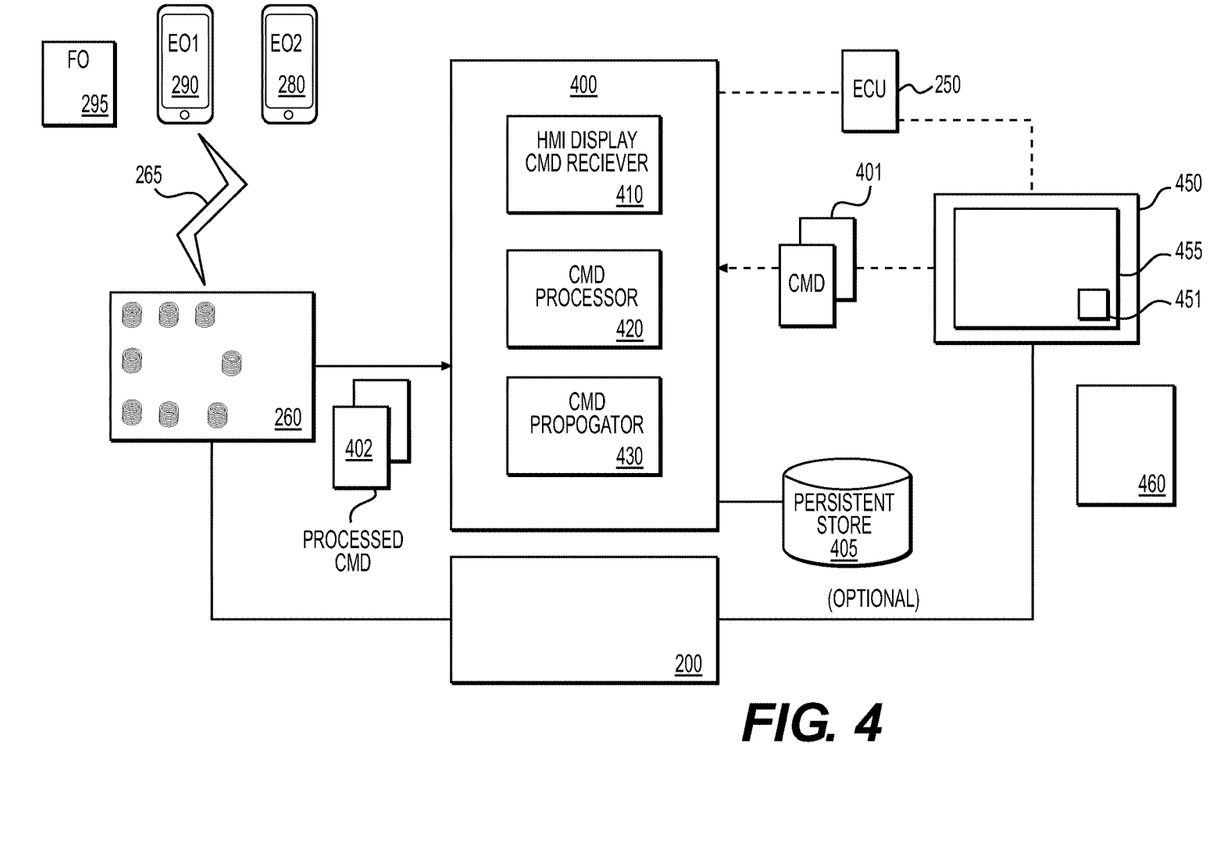
FIG. 4 illustrates an example of a system for controlling a wireless charging device via a human machine interface (HMI) display.

For example, if the receiver identification is received (310), the information processor 220 may correlate the received information 201 with known aspects about the receiver via a lookup table 206 (stored in persistent store 205). For example, the lookup table 206 may store a preference associated with electronic device 1 280, which may be employed to control the wireless charging. FIG. 4, which is described in detail below, describes this feature with greater In another example, the received identification (311), may be correlated with a recommend alignment (302), and the outputted information may correspond to a recommended location to place the electronic device 1 280 (i.e. a X, Y or X, Y, Z coordinate point).

The above-cited cases are exemplary. Other employments of the information 201 received via the information receiver 210 may also be realized.

The information communicator 230 communicates processed information 202 to a display 270 (or via a display driving device, such as ECU 250). The transformed information 202 may be employed to provide output onto the display 270.

In another implementation, the transformed information 202 may be presented in a non-display manner, for example, audibly, via haptic sensation, or the like.

FIG. 4 illustrates an example of a system 400 for controlling a wireless charging device 260 via a human machine interface (HMI) display 450. The system 400 includes a command receiver 410, a command processor 420, and a command communicator 430. The HMI display 450 may be coupled to the ECU 250, or directly coupled to the system 400.

The HMI display 450 is an engageable machine with an incorporated display. The HMI display 450 may include a graphical user interface (GUI) via a screen 455. The HMI display 450 may be controlled via an interface device, such as an input device 460. The input device 460 may be any interface device communicable to a HMI display 450. Alternatively, the HMI display 450 may be controlled via a touch interface 451, incorporated and embedded onto the screen 455 of the HMI display 450.

The HMI display 450, in the context of system 400, may be configured to present commands associated with the operation of the wireless charging device 260.

The HMI display command receiver 410 receives data generated from an input 401 from the HMI display 450. For example, the HMI display 450 may present an operator a query or request to command the wireless charging device 260 via engagement with the touch interface 451, or the input device 460. The commands and interfaces associated with the operation of the wireless charging device 260 will be enumerated below.

The command processor 420 receives the input 401, and determines a command 402 to communicate to the wireless charging device 260. The command 402 may be retrieved via a persistent store 405.

Figure 5:
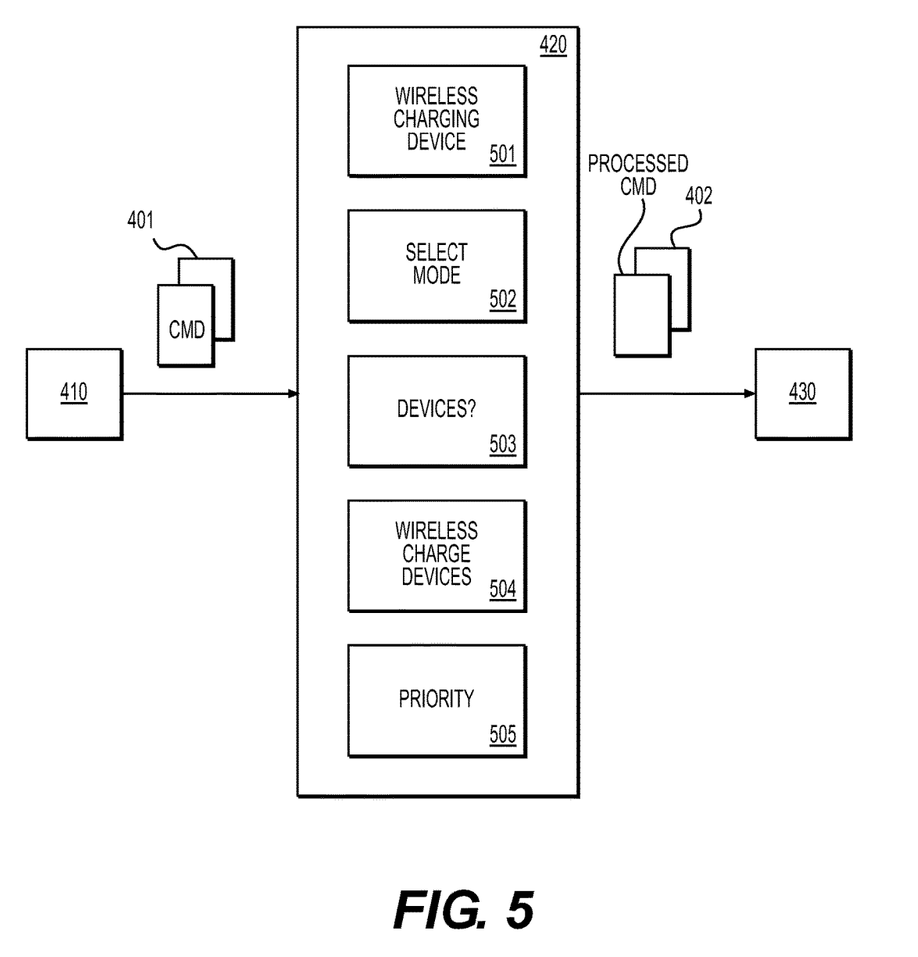
FIG. 5 illustrates an example of commands associated with the command processor.

FIG. 5 illustrates an example of commands associated with the command processor 420. These commands are exemplary, with any combinations of such being employable in an implementation of system 400.

Referring to FIG. 5, the command processor 420 includes:
1) Turn wireless charging device 260 On/Off (501);
2) Select a wireless charging mode for the wireless charging device 260 (for example, PMA, WPC, or A4WP) (502);
3) In response to multiple electronic devices being present on the wireless charging device 260, allowing a user to select to charge none, some, or all of the devices (503);
4) If multiple wireless charging devices are present or attached to system 400, allowing the user to select none, one, or all of the wireless charging device (504); and
5) Storing a pre-set condition (505), for example,
   A) charging a specifically identified device (via 311), with a specific mode of charging;
   B) not charging a specifically identified device;

C) in response to multiple devices being placed on a wireless charging device 260, performing the charging operation in a specific order.

Once the command 402 is generated, the command may be communicated to the wireless charging device 260. Accordingly, based on the command 402 selected (via the command processor 420), the wireless charging device 260 may modify an operation accordingly.

Figure 6:
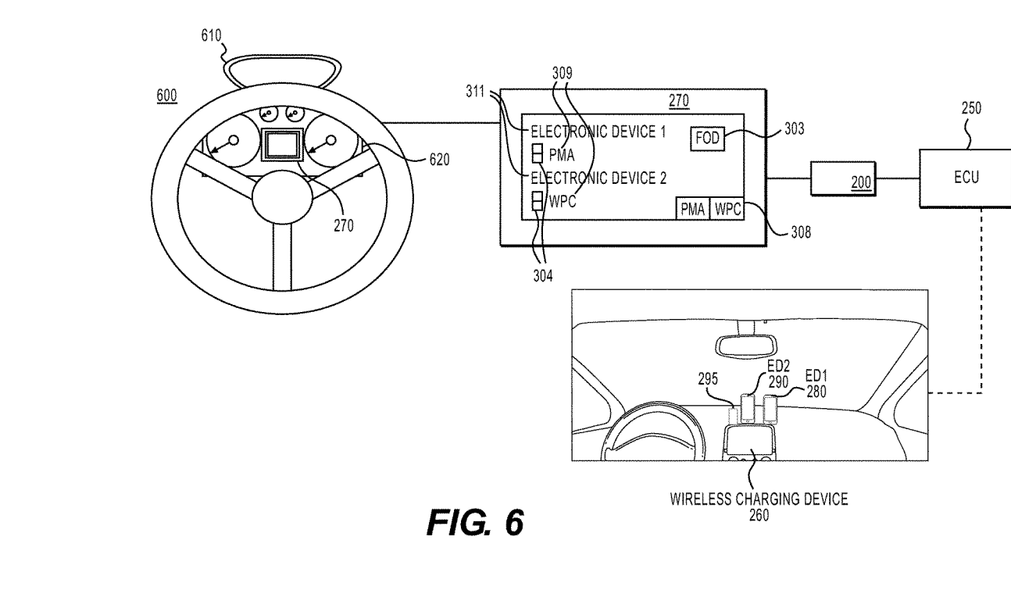
FIG. 6 illustrates an example implementation of the system of FIG. 2 in a vehicle.

FIG. 6 illustrates an example implementation of the system 200 in a vehicle 600. The vehicle 600 includes several displays, such as a heads-up display (HUD) 610, an instrument cluster display 620, and a center display (display 27). Each of the above-listed displays may serve as the display 270 described in FIG. 2.

Referring to FIG. 6, vehicle 600 shows that a wireless charging device 260 is implemented in an area near or around the seat area. The wireless charging device 260 is coupled to system 200, which is coupled to the ECU 250. The ECU 250 and the system 200 are visible in FIG. 6 for explanatory purposes. However, in several implementations, the system 200 and the ECU 250 may be obscured.

Several of the information 201 items are displayed via display 270. The example shown is exemplary, and the display 270 may be employed to display any of the items acquirable via FIG. 3. As shown, the individual devices are identified (311), the battery charge level (304), the mode of the individual device (309), and the capabilities of wireless charging device 260. Also shown is an indication that a foreign object 295 is on the wireless charging device 260 (303).

Figure 7:
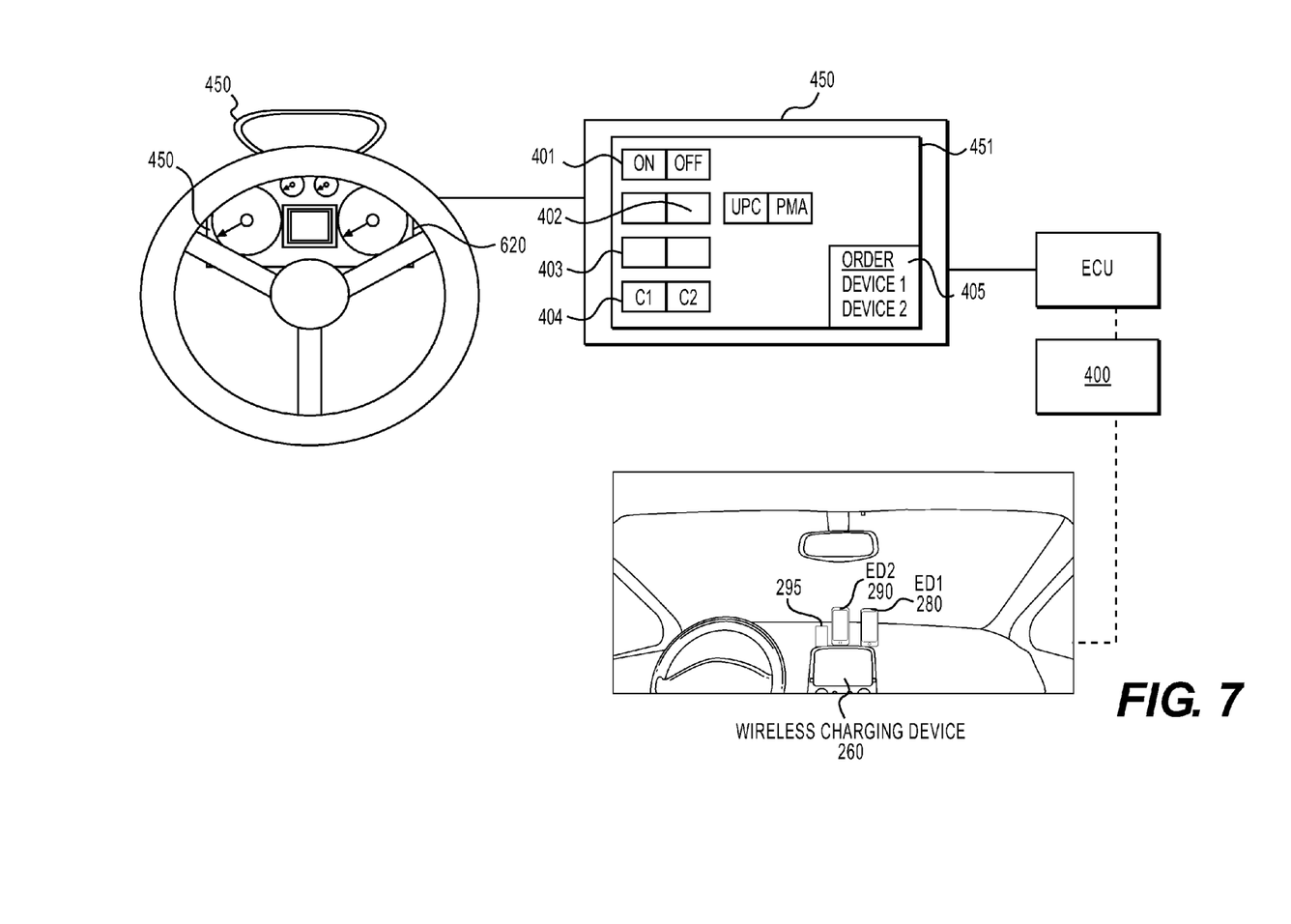
FIG. 7 illustrates an example implementation of the system of FIG. 4 in a vehicle.

FIG. 7 illustrates an example implementation of the system 200 in a vehicle 600. The vehicle 600 includes several displays, such as a heads-up display (HUD) 610, an instrument panel display 620, and a center display 630. Each of the above-listed displays may server as the HMI display 450 described in FIG. 4.

Referring to FIG. 7, the HMI display 450 is coupled to a system 400 and ECU 250. The HMI display 450 is engageable via a touch screen 451. In another example, the HMI display 450 may be controlled via an interface device 460. The wireless charging device 260 is also coupled to the system 400.

The HMI display 450 shows a GUI element to control the On/Off state of the wireless charging device 260 (401), the mode of charging (402), which devices to charge (403), a charger (404), and a priority (405). Accordingly, when a person engages any of the GUI elements shown above, the various modes associated with system 400 may be controlled.

In FIGS. 6 and 7, the systems 200 and 400, respectively, are individually implemented. However, in another example, the implementations of the concepts associated with systems 200 and 400 may be combined. Thus, the information obtained via system 200 (and displayed via a display 270 or HMI display 450) may be presented as part of system 400's interface. For example, the knowledge of the available modes (system 200) may be presented as options via system 400 to engage with.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for integrating a wireless charging device with a display, comprising:
    a data store comprising a computer readable medium storing a program of instructions for the integrating;
    a processor that executes the program of instructions;
    an information receiver to receive information from the wireless charging device;
    an information processor to process the information, and the processed information being about a wireless charging device or an electronic device on the wireless charging device; and
    an information communicator to communicate the processed information to a display coupled to the system,
    wherein the wireless charging device is configured to employ a first type of wireless charging and a second type of wireless charging,
    the received information identifies which of either the first type of wireless charging or the second type of wireless charging the electronic device is configured to receive wireless charge, and
    the system is further configured to switch the wireless charging device to the identified one of the first type of wireless charging or the second type of wireless charging.

2. The system according to claim 1, wherein the information is sourced via a data over coil transmission from the electronic device to the wireless charging device.

3. The system according to claim 1, wherein the processed information is defined as an on/off status of the wireless charging device.

4. The system according to claim 1, wherein the processed information is defined as an alignment aid for the electronic device relative to a transmitter coil associated with the wireless charging device.

5. The system according to claim 1, wherein the processed information is defined as a charge level of the electronic device.

6. The system according to claim 1, wherein the processed information is defined as a charge rate of the electronic device.

7. The system according to claim 1, wherein the processed information is defined as a charge efficiency of the electronic device.

8. The system according to claim 1, wherein the processed information is defined as a time to charge the electronic device via the wireless charging device.

9. The system according to claim 1, wherein the processed information is defined as a number of devices being actively charged via the wireless charging device.

10. The system according to claim 1, wherein the processed information is defined as an operation condition of a battery being wireles charged via the wireless charging device.

11. The system according to claim 10, wherein the processed information is further defined as an abnormal condition of the battery.

12. A system for controlling a wireless charging device via a human machine interface (HMI) display, comprising:
    a data store comprising a computer readable medium storing a program of instructions for the controlling;
    a processor that executes the program of instructions;
    a human machine interface (HMI) display command receiver to receive a command via the HMI display;
    a command processor to process the command; and
    a command propagator to communicate the processed command to the wireless charging device, and in response to a first electronic device and a second electronic device being on the wireless charging device in a state of wireless charging, the first electronic device only being wireless charge-able via a first type of wireless charging, and the second electronic device only being wirelessly charge-able via a second type of wireless charging, the processed command is defined as a selection of whether to set the wireless charging mode as either the first type of wireless charging or the second type of wireless charging.

13. The system according to claim 12, wherein the processed command is defined as an instruction to control the on/off state of the wireless charging device.

14. The system according to claim 12, wherein the processed command is defined a priority associated with wireless charging of each of the first electronic device and the second electronic device.

15. A system for integrating a wireless charging device with a display, comprising:
   a data store comprising a computer readable medium storing a program of instructions for the integrating;
   a processor that executes the program of instructions;
   an information receiver to receive information from the wireless charging device;
   an information processor to process the information, and the processed information being about a wireless charging device on the wireless charging device; and
   an information communicator to communicate the processed information to a display coupled to the system,
   the received information individually identifies at least two electronic devices, and
   the information receiver is further configured to receive an instruction of which of the two electronic devices is to be wireless charged.

* * * * *